United States Patent [19]

Eichenberger

[11] Patent Number: 4,930,182

[45] Date of Patent: Jun. 5, 1990

[54] APPARATUS FOR COUNTERBALANCING AN OVERHEAD DOOR

[75] Inventor: William A. Eichenberger, Toledo, Ohio

[73] Assignee: Apco Power-Unit Corporation, Toledo, Ohio

[21] Appl. No.: 339,117

[22] Filed: Apr. 14, 1989

[51] Int. Cl.$^5$ .............................................. E05F 1/08
[52] U.S. Cl. ........................................ 16/198; 16/197; 160/191; 242/107; 242/107.5
[58] Field of Search .................... 16/197, 198; 49/200; 160/191, 192; 242/107, 107.5

[56] References Cited

U.S. PATENT DOCUMENTS

| | | | |
|---|---|---|---|
| 2,630,597 | 3/1953 | Robinson | 160/191 |
| 3,038,535 | 6/1962 | Stroup et al. | 160/191 |
| 3,412,423 | 11/1968 | Binns | 16/198 |
| 3,615,065 | 10/1971 | Elliott | 242/107 |
| 3,635,277 | 1/1972 | Bahnsen | 160/191 |
| 3,921,761 | 11/1975 | Votroubek et al. | 185/39 |
| 4,731,905 | 3/1988 | Milano et al. | 16/306 |
| 4,817,927 | 4/1989 | Martin | 160/191 |

FOREIGN PATENT DOCUMENTS 1151779  5/1969  United Kingdom ................ 160/192

OTHER PUBLICATIONS

Apco Power-Unit Corporation, Hi-Lift Cable Drum, 1982, U.S.A.

Primary Examiner—Nicholas P. Godici
Assistant Examiner—James Miner
Attorney, Agent, or Firm—Marshall & Melhorn

[57] ABSTRACT

An apparatus for counterbalancing an overhead door includes a spring anchor assembly adapted to be connected between one end of a torsion spring and a wall of a building at an overhead door opening and a spring winding assembly adapted to be connected between the opposite end of a torsion spring and a shaft rotatably mounted on the wall and coaxial with the spring. The shaft carries a pair of winding drums attached by cables to the bottom of an overhead door. Both the spring anchor assembly and the spring winding assembly have spring attachment means which are adjustable to accommodate different diameters of torsion springs and compensate for the helical form of the spring.

18 Claims, 2 Drawing Sheets

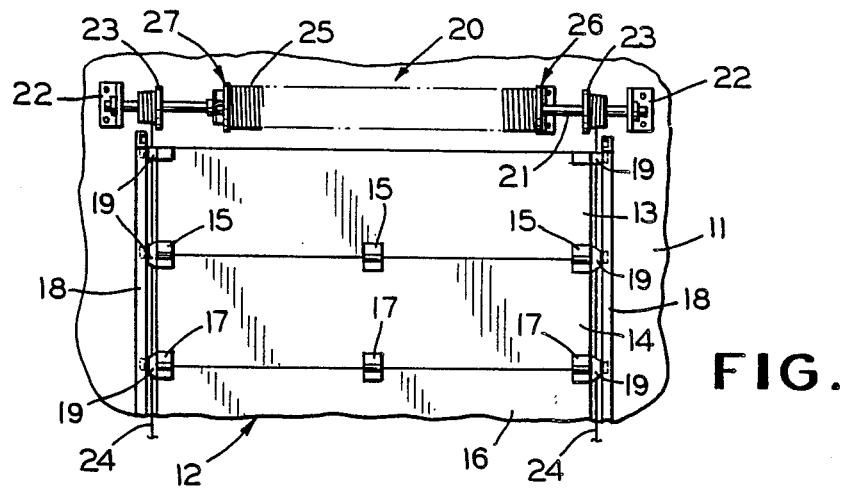
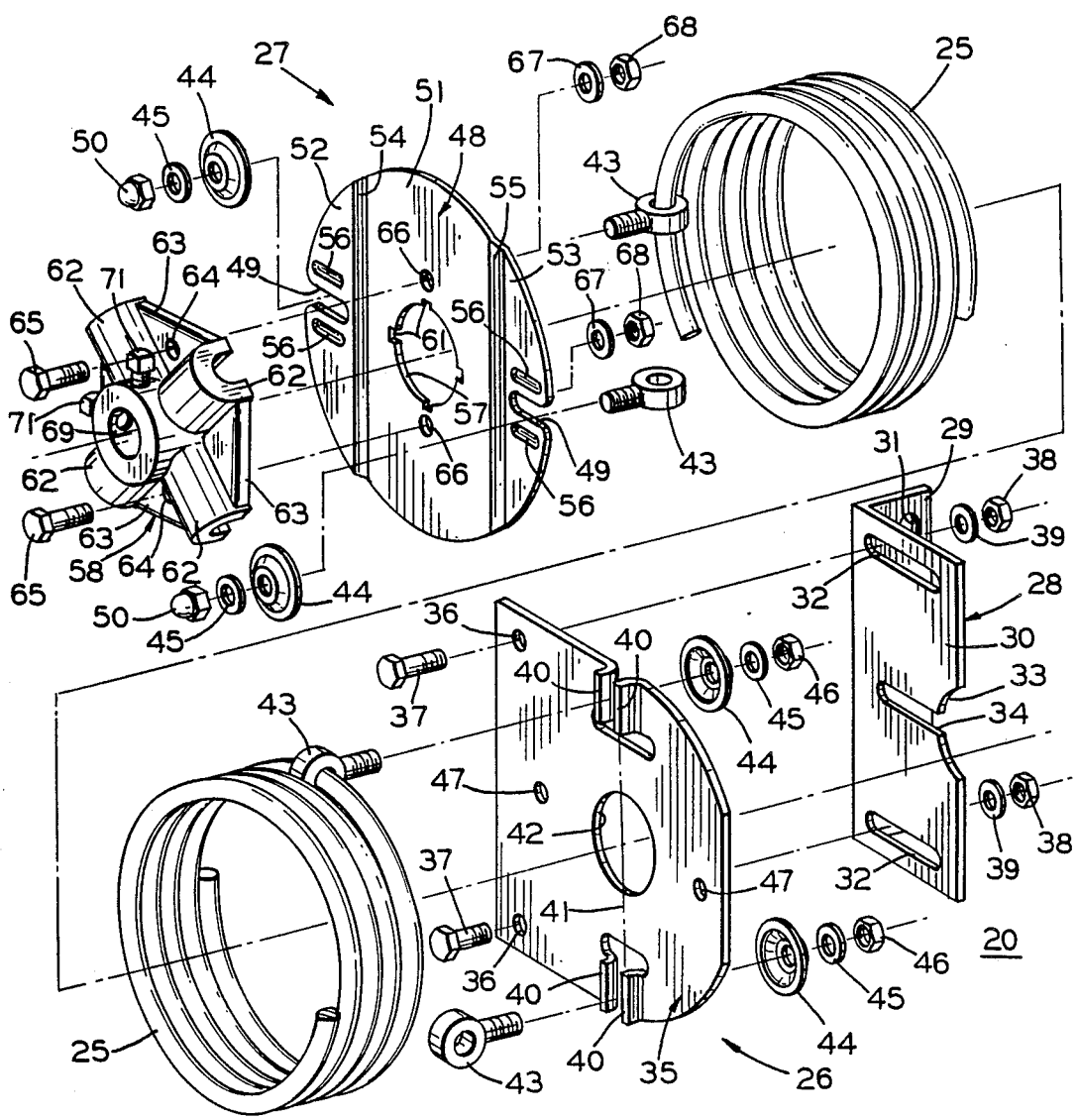

APPARATUS FOR COUNTERBALANCING AN OVERHEAD DOOR

BACKGROUND OF THE INVENTION

The present invention relates generally to an apparatus for winding torsion springs and, in particular, to an apparatus for counterbalancing an overhead door with a torsion spring.

Torsion spring counterbalance assemblies are commonly utilized to counterbalance the weight of an overhead door such as a garage door. Most residential and commercial overhead garage doors are of the sectional type which are suspended on overhead tracks when the door is in the up position. A typical torsion spring counterbalance assembly includes a shaft which is journaled for rotation in two or more bearing mounts which are generally attached to the wall above the door opening such that the shaft extends generally horizontally parallel with the door lintel. Cable drums are secured on each end of the shaft and each drum is attached to one end of an associated cable which is wound about the drum and has its opposite end secured to the bottom panel or section of the garage door. The shaft extends through the center of a coiled counterbalance torsion spring having one end secured to the shaft by a winding plug and the other end secured to the door lintel by an anchor plug. The spring is pretensioned and releasably attached to the shaft by the winding plug. The pretensioning tends to urge the drums to rotate in the take-up direction. As the door is lowered from its overhead position, its weight is increasingly shifted from the overhead tracks to the cables. This weight is counterbalanced by the torsion spring which is being wound tighter through the cable drums and the shaft.

Typically, the cable drums, the winding plug and the anchor plug are formed from metal castings. Since larger diameter springs are required for heavier doors, several different sets of spring winding and anchor plugs must be utilized in order to match each different diameter torsion spring. Thus, the manufacturer must provide separate molds for the different size plugs and provide a different production run for each size plug. The distributor and the garage door installer must carry a stock of each of the different size plugs to fulfill the demands of the marketplace.

It is an object of the present invention to provide an apparatus for counterbalancing an overhead door which apparatus accommodates various diameters of torsion springs.

It is another object of the present invention to provide an apparatus for counterbalancing an overhead door which apparatus reduces the need of the manufacturer to provide and the distributor and installer to stock many different sizes of torsion spring winding and anchor plugs.

SUMMARY OF THE INVENTION

The present invention concerns an apparatus for counterbalancing an overhead door. A spring anchor assembly is adapted to be attached to a wall above a door opening and includes means for attachment to one end of a torsion spring. The attachment means is adjustable for accommodating a predetermined range of torsion spring diameters. The apparatus also includes a spring winding assembly which is attached to the opposite end of the torsion spring and is releasably attached to a shaft which extends through the center of the torsion spring for pretensioning the spring. The spring winding assembly also has adjustable spring attachment means for accommodating different size torsion springs.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a rear elevational fragmentary view of an overhead door mounted in an opening in a building wall and including an overhead door counterbalancing apparatus in accordance with the present invention;

FIG. 2 is an exploded perspective view of the spring assembly of the counterbalancing apparatus shown in FIG. 1;

DESCRIPTION OF THE PREFERRED EMBODIMENT

Figure 3:
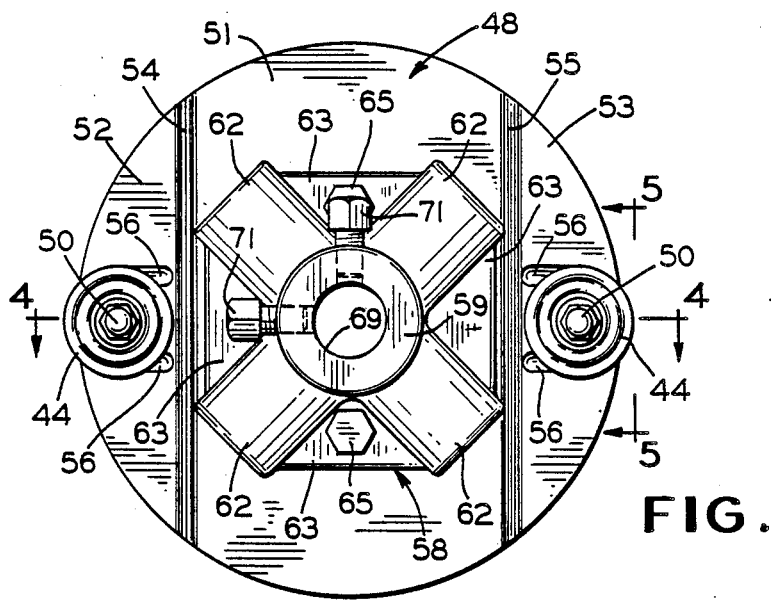
FIG. 3 is a left end elevational view of the spring assembly shown in FIG. 1 showing the spring winding assembly.

There is shown in FIG. 1 a wall 11 of a building having an opening closed by an overhead door 12. The door 12 is formed of a plurality of generally horizontally extending sections, each of which typically extends from one side of the door opening to the other. A top section 13 is attached to a next lower section 14 by hinges 15. A third section 16 is mounted below the section 14 and is attached thereto by hinges 17. A pair of tracks 18 are mounted on the wall 11 adjacent the opposite side edges of the overhead door 12. The tracks 18 typically extend from the floor (not shown) of the building vertically upwardly to the top of the door opening and then horizontally toward the interior of the building to provide parallel guide paths for the raising and the lowering of the overhead door 12. The opposite side edges of the door 12 are mounted for travel along the tracks 18 by roller assemblies 19.

The job of raising and lowering the overhead door 12 can be made easier by utilizing an overhead door counterbalancing apparatus 20. The counterbalancing apparatus 20 includes a generally horizontally extending shaft 21 having opposite ends rotatably mounted in a pair of brackets 22 attached to the wall 11. Any suitable means can be utilized to prevent the shaft 21 from shifting its position along its longitudinal axis. A pair of winding drums 23 are mounted at opposite ends of the shaft 21 for rotation therewith. Each of the winding drums 23 is associated with one of a pair of cables 24. One end of each of the cables is attached to its associated winding drum 23 and wrapped thereabout. The opposite end (not shown) of each of the cables 24 is attached to the bottom of the overhead door 12.

Also mounted coaxially on the shaft 21 is a torsion spring 25 having one end attached to a spring anchor assembly 26 and its opposite end attached to a spring winding assembly 27. As will be discussed below, the spring anchor assembly 26 is also attached to the wall 11 and the spring winding assembly 27 is releasably attached to the shaft 21 so that the torsion spring 25 can be rotated to apply a predetermined tension to the shaft 21. Although only one counterbalancing apparatus 20 is shown, two or more could be utilized depending upon the diameter and length of the torsion spring and the weight of the overhead door 12.

The counterbalancing apparatus 20 is shown in an exploded view in FIG. 2. The spring anchor assembly 26 includes a wall angle plate 28 formed with a pair of legs 29 and 30 extending at generally right angles to one another. The leg 29 is adapted to abut the wall 11 and has one or more apertures 31 formed therein for accepting fastening means (not shown) for attaching the plate 28 to the wall 11. When the wall angle plate 28 has been fastened to the wall 11 in the proper orientation, the leg 30 extends in a generally vertical plane which is perpendicular to the plane of the wall 11. A pair of apertures 32 are formed adjacent the upper and lower edges of the leg 30 and extend as slots in a generally horizontal direction. As will be discussed below, the apertures 32 are utilized to attach the one end of the torsion spring 25 to the wall 11. A semi-circular relief is formed in the vertically extending edge of the leg 30 to provide clearance for the shaft bearing. A generally horizontally extending slot 34 is formed in the leg 30 from the relief 33 toward the leg 29.

Releasably attached to the wall angle plate 28 is a spring anchor/bearing plate 35. A pair of apertures 36 are formed at opposite ends of a generally vertical edge of the plate 35. The threaded end of each of a pair of fasteners 37 extends through an associated one of the apertures 36 and an associated one of the slots 32 to threadably engage an associated one of a pair of nuts 38. A pair of lock washers 39 can be provided, each positioned between an associated one of the nuts 38 and the leg 30 of the plate 28. Before the nuts 38 are tightened onto the fasteners 37, the spring anchor/bearing plate 35 can be positioned by moving it toward or away from the wall 11.

The spring anchor/bearing plate 35 has a pair of slots each extending inwardly from an associated one of the upper and lower edges of the plate 28. Each of the slots is formed by slitting the plate and bending the edges of the slit toward the spring 25 to form a pair of flanges 40 which extend perpendicular to the plane of the plate 28. The flanges 40 are formed on opposite sides of a generally vertically extending centerline 41 which also extends through the center of a relatively large diameter aperture 42 formed in the plate 28 between the slots.

Figure 7:
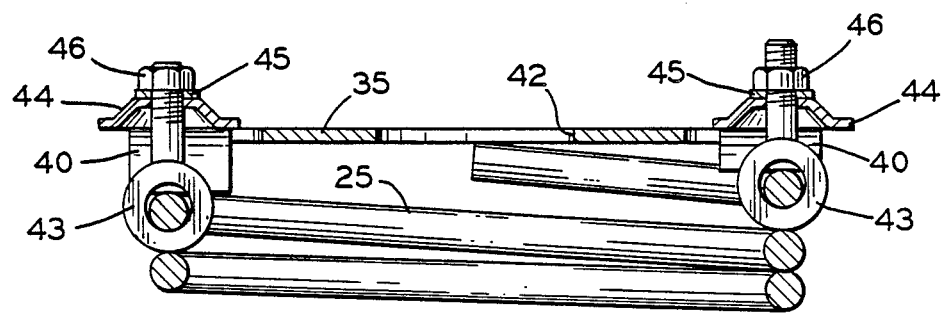
FIG. 7 is an enlarged cross-sectional view as if taken along a vertical centerline through the spring anchor assembly.

One end of the spring 25 is attached to the plate 35 by a pair of eye bolts 43. The head of each of the eye bolts 43 has an aperture formed therein for receiving a coil of the spring 25. A threaded shank on each of the eye bolts 43 extends between an associated pair of the flanges 40 and through an associated coined washer 44 through a lock washer 45 and threadably engages a nut 46. As the nuts 46 are tightened on the eye bolts 43, the facing edges of the flanges 40 will abut the end coil of the torsion spring 25. As shown in FIG. 7, a cross-sectional view taken along the centerline 41, one pair of the flanges 40 is longer than the other pair of the flanges 40 to compensate for the helical form of the spring 25. In FIG. 2, the upper pair of flanges 40 is longer than the lower pair of flanges 40 so that the longitudinal axis of the spring 25 is maintained generally perpendicular to the plane of the spring anchor/bearing plate 35. The shaft 21 (not shown) extends through the aperture 42. The shaft 21 can be supported in a bearing (not shown) and typically such bearings are formed with a flanged case having threaded apertures for receiving a pair of threaded fasteners. The plate 35 has a pair of apertures 47 formed therein located generally along a horizontal diameter of the aperture 42 through which the threaded fasteners for attaching the bearing can extend. The slot 34 formed in the leg 30 provides clearance for the fastener closer to the wall 11 of the building. The distance between the apertures 36 and the centerline 41 is such that when the plate 35 is closest to the wall 11, the fasteners 37 are located at the inner ends of the slots 32 and the aperture 42 is aligned with the relief 33 to provide clearance for the shaft 21.

Figure 4:
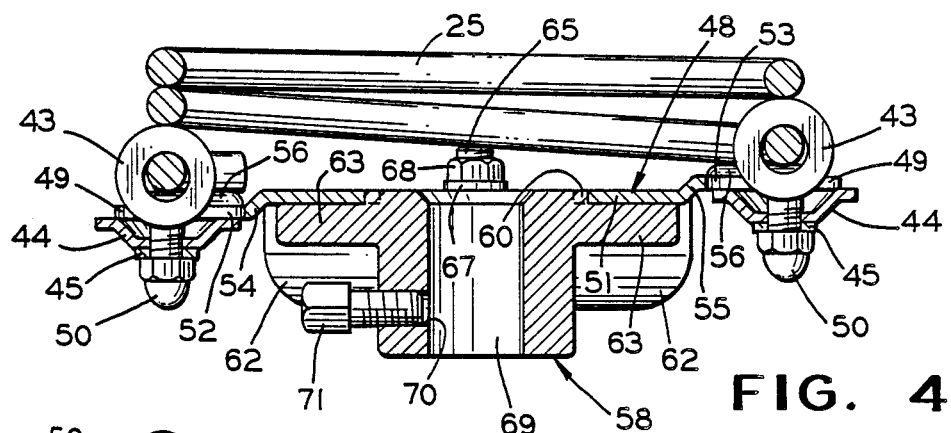
FIG. 4 is an enlarged cross-sectional view taken along the line 4—4 in FIG. 3.

The opposite end of the torsion spring 25 is attached to the spring winding assembly 27. The assembly 27 includes a generally circular spring winding plate 48. A pair of slots 49 extend inwardly from the periphery of the plate 48 along a diameter of the plate. The end of the torsion spring 25 adjacent to the plate 48 extends through apertures formed in the heads of a pair of the eye bolts 43. The eye bolts 43 extend through the slots 49 and through a pair of the coined washers 44, a pair of the lock washers 45 and threadably engage a pair of acorn nuts 50. In order to accommodate the helical form of the spring 25, the plate 48 is formed with a central portion 51 and a pair of diametrically opposed segments 52 and 53 connected to the central portion 51 by generally parallel extending angle sections 54 and 55 respectively (see FIG. 4). The central portion 51 extends on a plane which is generally perpendicular to the longitudinal axis of the torsion spring 25. The angle section 54 extends away from the end of the spring 25 and outwardly from the center of the central portion 51. At the outer edge of the angle section 54, the segment 52 extends in a plane generally parallel to the plane of the central portion 51. Similarly, the angle section 55 extends toward the spring 25 and outwardly from the center of the central portion 51. At the outer edge of the angle section 55, the segment 53 extends in a plane generally parallel to the plane of the central portion 51.

Figure 5:
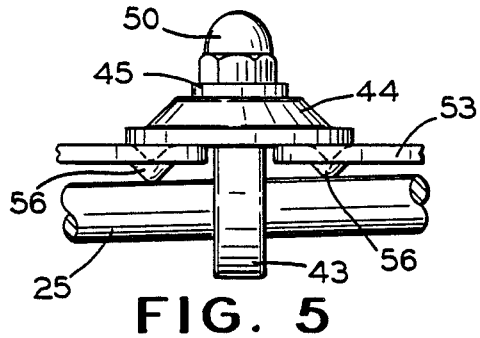
FIG. 5 is an enlarged fragmentary elevational view of the torsion spring attachment means taken along the line 5—5 in FIG. 3.

Each of the slots 49 is provided with a pair of adjacent generally parallel extending elongated depressions 56 which extend toward and abut the end coil of the torsion spring 25. Thus, the depressions 56 function in much the same manner as the flanges 40 on the plate 35 to engage the abutting end coil of the torsion spring 25. This function is more clearly seen in FIG. 5.

Figure 6:
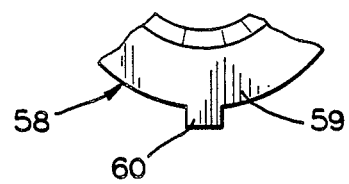
FIG. 6 is an enlarged fragmentary plan view of a lug on the spring winding boss shown in FIG. 4.

The central portion 51 of the plate 48 has a centrally located aperture 57 formed therein through which the shaft 21 (not shown) extends. A spring winding boss 58 is attached to the spring winding plate 48 and includes an annular hub 59 which extends into the aperture 57. The hub 59 has a plurality of radially extending tabs 60 (see FIG. 6) formed thereon for engaging a like plurality of radially extending slots 61 formed in the periphery of the aperture 57. The cooperating tabs 60 and slots 61 prevent relative rotation between the plate 48 and the boss 58. Extending radially from the annular hub 59 are four spokes 62 of semi-circular cross section. Connected between the spokes 62 are flanges 63. A pair of the flanges 63 on opposite sides of the hub 59 each have an aperture 64 formed therein for receiving a threaded fastener 65. The head end of the threaded fastener 65 abuts the flange 63 and the threaded shaft extends through the aperture 64 and a similar aperture 66 formed in the central portion 51 of the plate 48. The threaded end of the fastener 65 then extends through a lock washer 67 and engages a nut 68 to securely fasten the spring winding boss 58 to the spring winding plate 48.

The boss 59 has an aperture formed therein extending along its longitudinal axis and dimensioned to slidingly accept the shaft 21. A pair of radially extending threaded apertures 70 are formed in the side wall of the hub 59 at generally a right angle to one another and connect with the central aperture 69. Each of the threaded apertures 70 threadably accepts a threaded fastener 71. When the overhead door counterbalancing apparatus 20 has been assembled as shown in FIG. 1, a rod-like tool can be inserted into any one of the spokes 62 in order to apply a torque to rotate the spring winding assembly 27 thereby pretensioning the spring 25. When the desired degree of pretensioning has been achieved, the threaded fasteners 71 are tightened against the shaft 21 to prevent relative rotation between the shaft 21 and the spring winding boss 58.

As previously stated, the slots defined by the flanges 40 on the spring anchor/bearing plate 35 and the slots 49 on the spring winding plate 48 provide a means for accepting a range of diameters of torsion springs 25 utilizing a common set of attachment hardware. Thus, only a single set of the spring anchor assembly 26 and the spring winding assembly 27 are required to be manufactured and stocked for use with a wide range of different diameter torsion springs 25 Furthermore, the wall angle plate 28, the spring anchor/bearing plate 35, and the spring winding plate 48 can be formed by a metal stamping process which is typically less expensive than the prior art castings.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. In an apparatus for counterbalancing an overhead door including a shaft rotatably mounted on a building wall above a door opening, a pair of winding drums mounted on the shaft and connected to the door by cables, and a torsion spring, means for attaching the spring to the shaft and to the wall comprising:
   a spring winding assembly having adjustable attachment means for coupling to one end of a torsion spring and having releasable attachment means for coupling to a shaft and including a spring winding plate having said adjustable attachment means formed thereon;
   said adjustable attachment means including a pair of generally radially extending slots formed in said spring winding plate and a pair of eye bolts, each of said eye bolts having an apertured head for receiving a coil at the one end of the torsion spring and having a threaded shank extending through an associated one of said slots and engaging a nut, said eye bolt being moveable in said slots to accommodate the diameter of the coil of the torsion spring; and
   a spring anchor assembly having adjustable attachment means for coupling to the other end of the spring and means for attachment to a building wall, said adjustable attachment means both accommodating torsion springs of different diameters.

2. The means for attaching according to claim 1 including a pair of generally parallel extending elongated depressions located on opposite sides of each of said slots for engaging the abutting end coil of the torsion spring.

3. In an apparatus for counterbalancing an overhead door including a shaft rotatably mounted on a building wall above a door opening, a pair of winding drums mounted on the shaft and connected to the door by cables, and a torsion spring, means for attaching the spring to the shaft and to the wall comprising:
   a spring winding assembly having adjustable attachment means for coupling to one end of a torsion spring and having releasable attachment means for coupling to a shaft and including a spring winding plate having said adjustable attachment means formed thereon;
   a spring anchor assembly having adjustable attachment means for coupling to the other end of the spring and means for attachment to a building wall, said adjustable attachment means both accommodating torsion springs of different diameters; and
   wherein said plate is formed with a central portion and a pair of diametrically opposed segments connected to the central portion by generally parallel extending angle sections, each of said angle sections extending away from the plane of said central portion and outwardly from the center of said central portion in opposite directions whereby said opposed segments abut a coil at the one end of the torsion spring to maintain the plane of the central portion generally perpendicular to the longitudinal axis of the torsion spring.

4. The means for attaching according to claim 4 wherein said adjustable attachment means includes a pair of generally radially extending slots each formed in one of said segments, a pair of eye bolts each having an apertured head for receiving the coil on the one of the torsion spring and a threaded shank extending through an associated one of said slots to threadably engage an associated nut whereby said bolts are moveable in said slots for accommodating the diameter of the coil of the torsion spring.

5. The means for attaching according to claim 1 wherein said releasable attachment means includes at least one threaded fastener extending through a threaded aperture formed in a boss on said spring winding assembly/, said boss including a central aperture for receiving a shaft whereby an end of said threaded fastener engages an outer diameter of the shaft.

6. The means for attaching according to claim 5 wherein said boss is formed of a metal-casting.

7. The means for attaching according to claim 1 wherein said adjustable attachment means of said spring anchor assembly includes a spring anchor/bearing plate formed of a metal stamping.

8. The means for attaching according to claim 7 wherein said spring anchor/bearing plate includes a pair of generally radially extending slots each defined by a pair of flanges for abutting a coil at the other end of the torsion spring, one pair of said flanges being longer than the other pair of said flanges to compensate for the helical form of the torsion spring.

9. The means for attaching according to claim 7 including a pair of slots formed in said spring anchor/bearing plate, a pair of eye bolts each having an apertured head for retaining the coil at the other end of the torsion spring and having a threaded shaft extending through an associated one of said slots and engaging an associated nut whereby said eye bolts are moveable in said slots for accommodating the diameter of the coil of the torsion spring.

10. The means for attachings according to claim 7 wherein said means for attachment to a building wall includes a wall angle plate and means for attaching said spring anchor/bearing plate to said wall angle plate and allowing movement of said spring anchor/bearing plate toward and away from the wall when said wall angle plate is attached to the wall.

11. An apparatus for counterbalancing an overhead door comprising:
    a torsion spring;
    a spring winding assembly including a spring winding plate and a spring winding boss, said spring winding plate having a central portion connected to a pair of opposed segments by generally parallel angle sections extending in opposite directions, each of said opposed segments having a slot formed therein;
    a first pair of eye bolts each having an apertured head for receiving a coil at one end of said torsion spring and a threaded shank extending through an associated one of said slots and threadably engaging a nut, said bolts being moveable in said slots for accommodating the diameter of the coil;
    said spring winding boss being attached to said central portion of said spring winding plate and including means for releasably attaching said spring winding assembly to a shaft extending through central apertures in said spring winding boss and said spring winding plate;
    a spring anchor assembly including a spring anchor/bearing plate and a wall angle plate, said spring anchor/bearing plate having a pair of slots formed therein;
    a second pair of eye bolts each having an apertured head for receiving a coil at the other end of said torsion spring and a threaded shaft extending through an associated one of said slots and engaging an associated nut; and
    said wall angle plate adapted to be attached to a wall of a building and including means for attaching said spring anchor/bearing plate to said wall angle plate to enable said spring anchor/bearing plate to move toward and away from the wall, and wherein each of said second pair of eye bolts is moveable in said associated one of said slots for accommodating the diameter of the coil of said torsion spring.

12. The apparatus according to claim 11 wherein said spring winding boss is formed of a metal material by a casting process and said spring winding plate, said spring anchor/bearing plate and said wall angle plate are formed of metal material by a stamping process.

13. In an apparatus for counterbalancing an overhead door including a shaft rotatably mounted on a building wall above a door opening, a pair of winding drums mounted on the shaft and connected to the door by cables and a torsion spring, means for attaching the spring to the shaft and to the wall comprising:
    a wall angle plate adapted to be attached to a building wall;
    a spring anchor/bearing plate having a first pair of slots formed therein;
    means for attaching said spring anchor/bearing plate to said wall angle plate to allow said spring anchor/bearing plate to move toward and away from the wall;
    a first pair of eye bolts and nuts for cooperating with said first pair of slots to attach one end of a torsion spring to said spring anchor/bearing plate, said first pair of eye bolts being moveable in said first pair of slots for accommodating the diameter of a coil of the torsion spring;
    a spring winding boss having means for releasably attaching the torsion spring to a coaxial shaft;
    a spring winding plate having a second pair of slots formed therein;
    a second pair of eye bolts and nuts cooperating with said second pair of slots for attaching the other end of the torsion spring to said spring winding plate, said eye bolts being moveable in said second pair of slots for accommodating the diameter of the coil of the torsion spring.

14. The means for attaching according to claim 13 wherein said spring anchor/bearing plate has a pair of flanges formed along edges of each of said second pair of slots for abutting the coil at the other end of the torsion spring, one pair of said flanges being shorter than the other pair of said flanges to compensate for the helical form of the spring thereby maintaining said spring anchor/bearing plate in a plane generally perpendicular to a longitudinal axis of the spring.

15. The means for attaching according to claim 13 wherein said means for attaching said spring anchor/bearing plate to said wall angle plate includes a pair of apertures formed in said spring anchor/bearing plate, a pair of slotted apertures formed in said wall angle plate, and a pair of threaded fasteners each extending through an associated one of said apertures and said slotted apertures for threadably engaging a nut.

16. The means for attaching according to claim 13 wherein said means for releasably attaching includes a threaded fastener extending through a threaded aperture formed in said spring winding boss for releasably engaging the shaft.

17. The means for attaching according to claim 13 wherein said spring winding plate has a central portion connected to a pair of opposed segments by a pair of angle sections extending in opposite directions to position said segments on opposite sides of said central portion to accommodate the helical form of the torsion spring.

18. The means for attaching according to claim 13 wherein said spring winding plate includes a pair of elongated depressions formed on opposite sides of each of said second pair of slots for abutting the coil at the one end of the torsion spring.

* * * * *